(No Model.)
F. C. H. STRASBURGER.
MEASURING FAUCET.
No. 448,093. Patented Mar. 10, 1891.
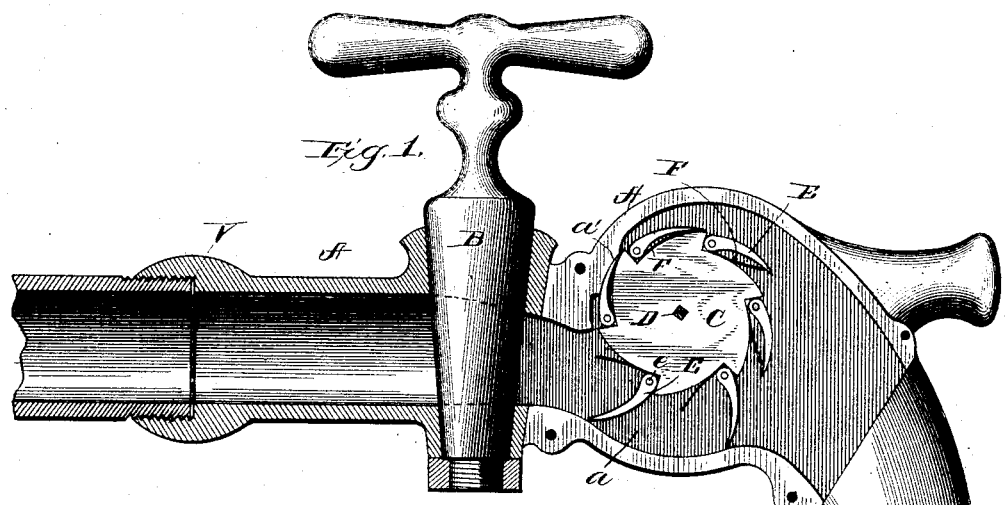
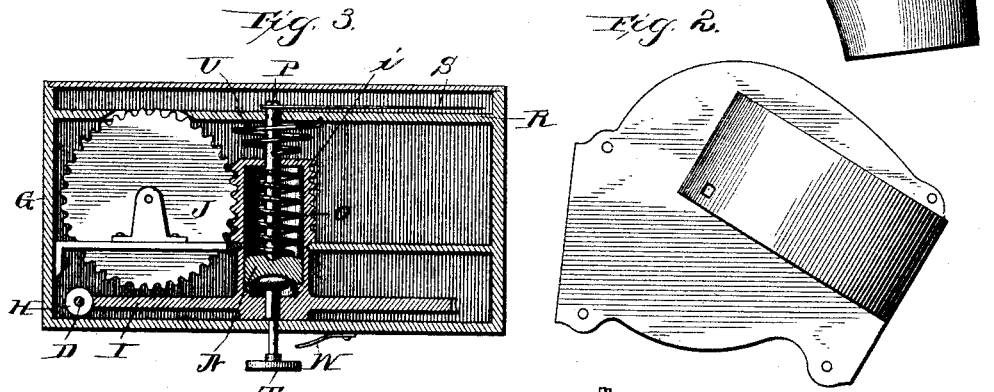
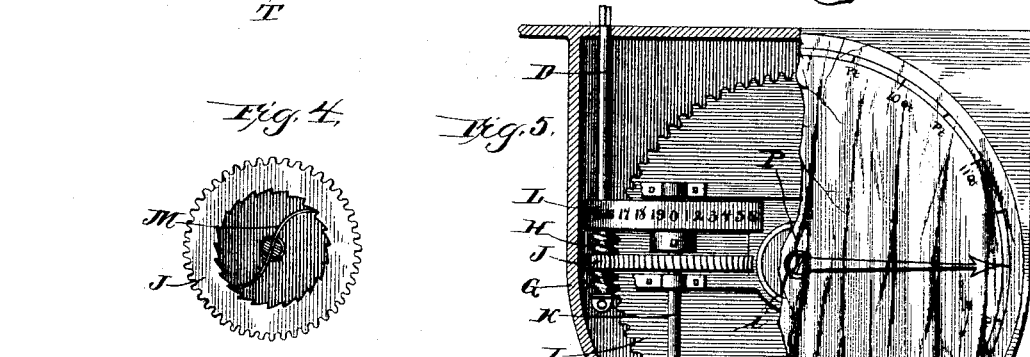
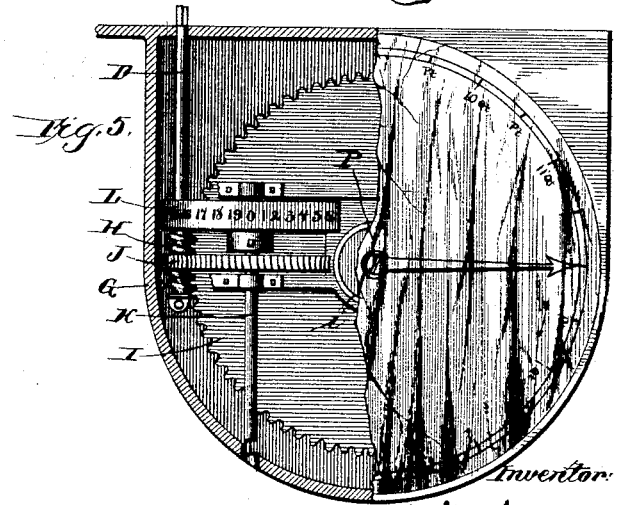
Witnesses:
Wm. M. Rheem
R. Hurdeman
Inventor:
F. C. H. Strasburger
Raymond & Veeder
Attys

UNITED STATES PATENT OFFICE.

FRANK. C. H. STRASBURGER, OF CHICAGO, ILLINOIS.

MEASURING-FAUCET.

SPECIFICATION forming part of Letters Patent No. 448,093, dated March 10, 1891.

Application filed November 17, 1890. Serial No. 371,658. (No model.)

*To all whom it may concern:*

Be it known that I, FRANK. C. H. STRASBURGER, a citizen of the United States, residing in Chicago, in the county of Cook and the State of Illinois, have invented certain new and useful Improvements in Measuring-Faucets, of which the following is a specification.

The object of my invention is to provide a faucet which will be adapted to measure the liquid which passes through it and to show the amount which has passed through by means of dials. Means are also provided for making the separate measurement of small quantities.

In the drawings, Figure 1 is a side view, partly in section, of a faucet embodying my invention. Fig. 2 is a side elevation of the plate to which is attached the case for the indicating-dials. Fig. 3 is a vertical section, on an enlarged scale, of the case containing the dials and the device connecting the same to the measuring-wheel within the faucet. Fig. 4 shows a detail of the apparatus. Fig. 5 is a top view of the dial, a portion being broken away to show the parts within the interior of the case.

A, Fig. 1, is the body of the faucet. The plug B regulates the flow of the liquid in the ordinary manner.

C is a wheel rotating within the body of the faucet upon a spindle D. It is provided with blades or vanes E, which are pivoted within recesses upon the edge of the wheel, the small springs F being provided under the blades to assist in throwing them outward. The pivotal points $c$ of the blades are so located with reference to the shoulder of the recesses within which the blades are pivoted as to permit a limited opening only of the blades. The interior of the case of the body A within which the wheel is placed is so shaped as to form the passage $a$, beneath the wheel C, across which the blades E extend when open. Above the passage $a$ the body comes closer to the wheel C, so as to form an abutment $a'$, with which the blade E forms a tight joint when closed, the blades being curved so as to form a part of the circumference of the wheel C in their closed position. The spindle D extends through the body of the faucet into the casing G, Figs. 3 and 5, the portion within the casing being provided with a worm H, and said worm driving the gear I. Said gear I is provided with a hollow axle, the exterior of which is threaded to form a worm which drives the gear J. The last-named gear is mounted upon an axle K, upon which axle is also mounted a dial L, marked upon its edge so as to indicate the quantity of liquid which has passed through the faucet. The gear J and the dial L are not rigidly connected, a spring M, Fig. 4, being attached to one and its curved ends engaging with ratchet-teeth formed within a recess with the other, as shown in Figs. 4 and 5. As shown, the dial L is made fast upon the axle K, and the spring M is inserted in the slot made through the axle, while the gear J is loose thereon; but any ratchet-connection for the said dial and gear would serve the same purpose.

Within the hollow axle $i$ of the gear I is fitted a clutch N, a spring O serving to keep it in engagement with the clutch formed at the bottom of the cavity within the axle I. From the clutch N a spindle P extends up through a dial-face R, and a hand or pointer S is attached thereto. A push-button T is provided for disengaging the clutch N, and a light spring U is attached to the spindle P for bringing the pointer S back to the zero-mark when the clutch N has been released. The purpose of employing the detachable pointer S and its corresponding dial in addition to the recording-dial L is to enable small quantities to be measured easily and without the necessity for calculation by starting at the zero-point as each separate draft is made.

The dial L shows the total amount which has been drawn, and is ordinarily not reset until the cask, barrel, or tank has been emptied. When it is desired to reset the dial L, it may be done by a key fitted to the shaft I, the spring-and-ratchet connection of the worm-gear and dial permitting the dial to be advanced until the zero-point is reached.

In order to secure the measuring-wheel within the faucet from the derangement by sediment, I prefer to insert a strainer or screen in the tube leading from the tank or barrel, as seen at V, Fig. 1.

At W, Fig. 3, is shown a catch, which, by turning on its rivet by which it is secured to the case, may be brought over the end of the button T, when the latter is pushed in to release the pointer, which is thus thrown out of operation when desired.

I claim—

1. The combination, in a measuring-faucet, of a wheel rotated by the passage of liquid through said faucet, and indicating devices showing the amount of liquid corresponding to the revolutions of said wheel, said indicating devices consisting of a pointer moving over the dial and driven by gearing connected to said pointer by means of a clutch, means for releasing said clutch, a spring adapted to return said pointer to zero when the clutch is released, and a second dial also put in motion by the measuring-wheel within the faucet through a ratchet connection which permits it to be separately set to zero, substantially as described.

2. The combination, in a measuring-faucet, of a wheel rotatable by the passage of the liquid through the faucet, and indicating devices showing the quantity of liquid corresponding to the revolutions of said wheel, said indicating devices consisting of a worm-gear having a hollow axle, within which axle is fitted a clutch and a spring adapted to hold such clutch in engagement with said gear, a spindle connected to said clutch and carrying the pointer moving over the dial, and a spring attached to said spindle adapted to return the pointer to the zero-mark when released, substantially as described.

3. The combination, in a measuring-faucet, of a wheel rotated by the passage of liquid through said faucet, and indicating devices showing the amount of liquid corresponding to the revolutions of said wheel, said indicating devices consisting of a pointer moving over the dial and driven by gearing connected to said pointer by means of a clutch, means for releasing said clutch, a spring adapted to return said pointer to zero when the clutch is released, and a second dial also put in motion by the measuring-wheel within the faucet, substantially as described.

4. The combination, in a measuring-faucet, of a wheel rotatable by the passage of the liquid through the faucet, and indicating devices showing the quantity of liquid corresponding to the revolutions of said wheel, said indicating devices consisting of a worm-gear having a hollow axle, within which axle is fitted a clutch and a spring adapted to hold said clutch in engagement with said gear, a spindle connected to said clutch and carrying the pointer moving over the dial, and a spring attached to said spindle adapted to return the pointer to the zero-mark when released, the exterior of said axle being threaded and engaging with a worm-gear which drives a dial graduated to show the quantity of liquid which has passed through the faucet.

FRANK. C. H. STRASBURGER.

Witnesses:
IRWIN VEEDER,
TODD MASON.